(No Model.)

C. L. SPENCER.
RAISIN SEEDING MACHINE.

No. 525,432. Patented Sept. 4, 1894.

Witnesses.
Wilton H. Spencer
John C. Spencer

Inventor.
Charles L. Spencer

UNITED STATES PATENT OFFICE.

CHARLES L. SPENCER, OF PROVIDENCE, RHODE ISLAND.

RAISIN-SEEDING MACHINE.

SPECIFICATION forming part of Letters Patent No. 525,432, dated September 4, 1894.

Application filed March 23, 1894. Serial No. 504,888. (No model.)

*To all whom it may concern:*

Be it known that I, CHARLES L. SPENCER, of the city and county of Providence, in the State of Rhode Island, have invented new and useful Improvements in Raisin-Seeding Machines; and I do hereby declare that the following specification, taken in connection with the drawings making a part of the same, is a full, clear, and exact description thereof, in which—

Figure 1:
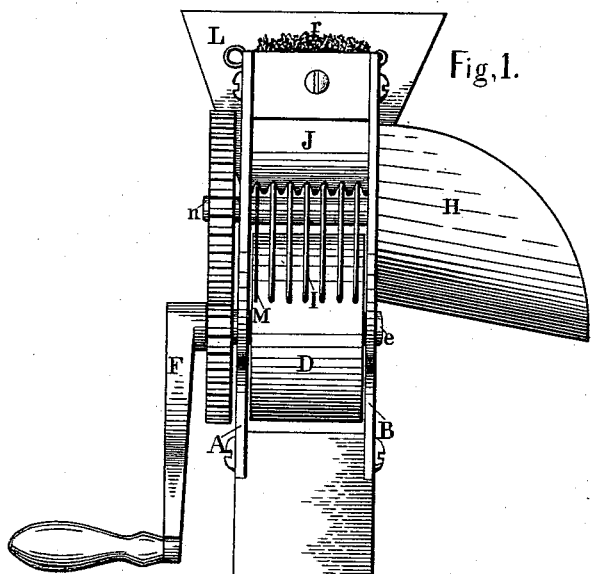
Figure 3:
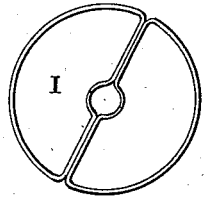
Figure 4:
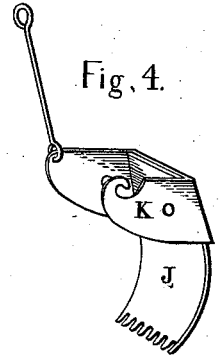
Figure 2:
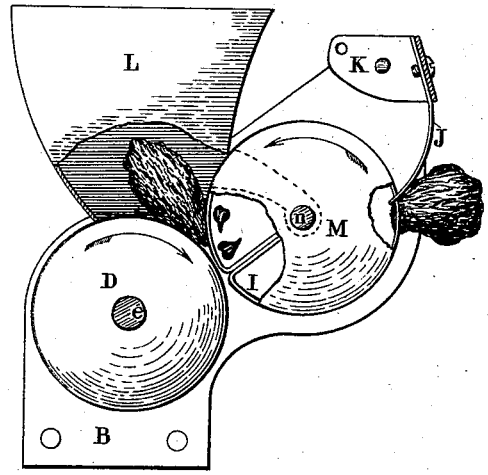

Figure 1 represents a vertical front view of the whole machine. Fig. 2 is a vertical sectional side view, having one of its sides removed, and a portion of parts cut away showing the interior working of the machine. Fig. 3, represents wire wheels as I now construct them. Fig. 4, is a perspective view of the shedder and holder.

My invention relates to improvements in raisin seeding machines in which flexible wires operate in connection with a roller and shedder, and it consists first, in a number of flexible wire wheels arranged on a shaft and secured thereon as a circular grating to receive the seeds of raisins between them. Second, in a roller to operate as lateral pressure in combination with flexible wire wheels. Third, in a shedder for the delivery of seeded raisins, and fourth, in the attachment of a suitable material as a sponge for holding water in moistening the flexible wire wheels, all as described.

In the accompanying drawings, Fig. 1. A and B are the two sides, fastened at their lower ends to the clamp C. These parts constitute the frame work of the machine.

The roller D being made of some suitable material, as wood, rubber, or metal, it is secured upon the shaft *e* and fitted with the same, between the sides A and B through bearings, that it may be revolved by the crank F, said crank being attached to the extended end of the shaft *e* for the purpose. The flexible wire wheels I, are arranged upon the shaft *n*, and secured thereon a suitable distance apart, so that their rims, or exterior parts may be parallel with each other, similar as a circular grating, and that a raisin seed may not drop between them. Said flexible wheels I, together with shaft *n*, are also fitted to revolve through bearings between the sides A and B, and in close proximity to roller D, without coming in contact therewith. Upon each extended end from side A of the shafts *e* and *n*, a cog wheel is secured, so that the cogs of each wheel may mesh or work together for revolving the flexible wheels I in connection with the roller D, when the machine is in use, by which means, raisins may be carried as represented in sectional Fig. 2, between the aforesaid roller D and the flexible wheels I around to the shedder J, and at the same time, the lateral pressure produced through the operation from the periphery surface of the roller D, the seeds of the raisin are forced within the flexible wheels I, by springing their rims apart.

The shedder, or deliverer J, Fig. 4, is constructed of sheet metal, bent in a circular form and provided with teeth at its lower edge, the same distance apart to fit between, and correspond with the rims of the flexible wire wheels I. The upper or opposite end of said shedder, is secured within the holder K at its front, and in combination with said holder, when the two parts are adjusted and fastened in their proper places, between the upper ends of the sides A and B, as represented in Fig. 1, a receptacle is formed for the sponge *r*, which sponge is held therein by a wire over its top, one end of said wire being attached to swing through a hole drilled in one side of holder K and its opposite end is passed into a hook formed upon the opposite side of the aforesaid holder, as represented in Fig. 4. The teeth of shedder J, are made the proper length, and bent inwardly to extend a short distance within the thickness of the rims of the flexible wire wheels I, that the pulp of the raisin may not be carried underneath the same, represented in sectional Fig. 2.

Upon the top of the sides A and B over the roller D, is attached a funnel L, for receiving the raisins to be seeded, Fig. 1, and sectional Fig. 2. The side B is provided with a conductor H near the end of the flexible wire wheels I, Fig. 1, for the purpose of receiving the seeds of raisins from between the sides of the said flexible wire wheels, as they may be discharged therefrom. At this point side B being cut through as an outlet, with the exception of a portion being left for a bearing, that the shaft *n* may turn therein, as represented by dotted lines in sectional Fig. 2.

In arranging the flexible wire wheels I, the spokes of every other wheel are secured on a line with each other throughout, so that a raisin seed may not be wedged between the spokes of adjoining wheels and furthermore, that the seeds of raisins may not pass but one way from said wheels, a thin plate wheel M is secured upon the shaft $n$ near the side A, to revolve with the aforesaid flexible wire wheels I, represented in Fig. 1, and sectional Fig. 2, a portion of said plate wheel in Fig. 2, being cut away in showing the operation of extracting seeds from raisins.

In constructing a flexible wire wheel as I have represented in Fig. 3, of the drawings, the rim, or felly, together with the spokes, are formed from two pieces of German silver wire, each wire being curved as an arch or segment of a circle, and the spokes bent from the terminus ends of the segments, or at the base of the arches, at right angles toward each other to near the center of the wheel, at which point, the short continuation or ends of the wire, are curved concentric to the wheel's center, for the purpose of securing a metal cap thereon in forming the hub, and holding the two arches or segments of the circumference in opposite positions to each other in attaining a perfect wheel. There are other ways of constructing flexible wheels, but for simplicity and cheapness I now prefer the method described.

The clamp C, is made in the usual way for attaching to a table or shelf in holding the machine steady when in use. Therefore I do not claim the same as new; but What I do claim as my invention, and desire to secure by Letters Patent of the United States, is—

1. In a raisin seeding machine, the flexible wire wheels I, arranged upon the shaft $n$, and secured thereon as a circular grating for the purpose of receiving seeds of raisins between them, substantially as set forth.

2. The roller D in combination with the flexible wire wheels I, for producing lateral pressure in forcing the seeds of raisins between the rims of said flexible wheels, substantially as herein described.

3. The shedder J, in combination with the flexible wire wheels I, said shedder being provided with teeth at its lower end for operating between the rims of the said flexible wire wheels in removing raisins therefrom after being seeded, substantially as set forth.

4. The combination with the flexible wire wheels I, the sponge $r$, for containing water for moistening the rims of said wheels, whereby the seeded raisins may be more easily removed therefrom, substantially as specified.

CHARLES L. SPENCER.

Witnesses:
WILTON H. SPENCER,
JOHN C. SPENCER.